(12) United States Patent
Reedman (10) Patent No.: US 9,103,733 B2
(45) Date of Patent: Aug. 11, 2015

(54) BEARING MONITORING USING A FIBER BRAGG GRATING

(75) Inventor: Adam Reedman, Hoornaar (NL)

(73) Assignee: AKTIEBOLAGET SKF, Gothenburg (SE)

( * ) Notice: Subject to any disclaimer, the term of this patent is extended or adjusted under 35 U.S.C. 154(b) by 452 days.

(21) Appl. No.: 13/511,410

(22) PCT Filed: Nov. 26, 2010

(86) PCT No.: PCT/EP2010/007189
§ 371 (c)(1),
(2), (4) Date: Sep. 10, 2012

(87) PCT Pub. No.: WO2011/066927
PCT Pub. Date: Jun. 9, 2011

(65) Prior Publication Data
US 2013/0004117 A1    Jan. 3, 2013

Related U.S. Application Data

(60) Provisional application No. 61/283,557, filed on Dec. 4, 2009.

(51) Int. Cl.
*G02B 6/00* (2006.01)
*G01L 5/00* (2006.01)
(Continued)

(52) U.S. Cl.
CPC ............ *G01L 5/0009* (2013.01); *F16C 19/522* (2013.01); *F16C 33/30* (2013.01);
(Continued)

(58) Field of Classification Search
None
See application file for complete search history.

(56) References Cited

U.S. PATENT DOCUMENTS 5,757,487 A * 5/1998 Kersey ..................... 356/478
6,080,982 A * 6/2000 Cohen ................... 250/227.11
(Continued)

FOREIGN PATENT DOCUMENTS

DE   102007050576 A1   4/2009
DE   102008061553 A1   6/2010
(Continued)

OTHER PUBLICATIONS

XP002617620 Fiber Optic Strain Measurement for Machine Monitoring, L. Hoffman, M.S. Mueller, A.W. Koch, Technische Universitaet Muenchen Institute for Measurement Systems and Sensor Technology, Theresienstr, 90, 80333 Munich, Germany, Optical Measurement Systems for Industrial Inspection V, Proceedings of SPIE, 20070618 SPIE, US-ISSN 0277-786X, SPIE vol. 6616, 66163A-1, (2007).

*Primary Examiner* — Michelle R. Connelly
*Assistant Examiner* — John M Bedtelyon
(74) *Attorney, Agent, or Firm* — Bryan Peckjian; SKF USA Inc. Patent Dept.

(57) ABSTRACT

A bearing comprises a Bragg grated optical fiber to measure one or more parameters of the bearing such as load, temperature, acceleration/vibration and identification. To be able to fit as many Bragg gratings as possible, the utilization of the corresponding frequency plane output is optimized by having low bandwidth next to large bandwidth sensors in the frequency place. The corresponding physical sensors such as load sensors on a bearing will not be adjacent. Sensors in the loaded zone are giving a high bandwidth output and sensors in the un-loaded zone are giving a low bandwidth output, thus even though these are not physically adjacent, the corresponding frequency areas are adjacent by appropriate grating.

6 Claims, 6 Drawing Sheets

(51) Int. Cl.
| | |
|---|---|
| *G01D 5/353* | (2006.01) |
| *G02B 6/02* | (2006.01) |
| *G01L 1/24* | (2006.01) |
| *G01M 13/04* | (2006.01) |
| *F16C 19/52* | (2006.01) |
| *F16C 33/30* | (2006.01) |
| *F16C 33/58* | (2006.01) |

(52) U.S. Cl.
CPC ......... *F16C 33/586* (2013.01); *G01D 5/35303* (2013.01); *G01D 5/35367* (2013.01); *G01L 1/246* (2013.01); *G01M 13/04* (2013.01); *G02B 6/0208* (2013.01)

(56) References Cited

U.S. PATENT DOCUMENTS

| | | | |
|---|---|---|---|
| 6,980,298 B2* | 12/2005 | Discenzo | 356/477 |
| 7,295,724 B2* | 11/2007 | Wang et al. | 385/13 |
| 7,512,294 B2* | 3/2009 | Wang et al. | 385/13 |
| 8,195,015 B2* | 6/2012 | Becker | 385/13 |
| 2005/0232532 A1* | 10/2005 | Wang et al. | 385/13 |

FOREIGN PATENT DOCUMENTS

| | | |
|---|---|---|
| JP | 2008249014 A | 10/2008 |
| WO | WO2009149971 A1 | 12/2009 |
| WO | WO2010043699 A1 | 4/2010 |

* cited by examiner

BEARING MONITORING USING A FIBER BRAGG GRATING

CROSS-REFERENCE

This application is the US national stage of International Application No. PCT/EP2010/007189 filed on Nov. 26, 2010, which claims priority to U.S. Provisional Application 61/283,557 filed Dec. 4, 2009.

TECHNICAL FIELD

The invention is related to condition monitoring of bearings, in particular in combination with load sensing.

BACKGROUND

Bearings are a very important component in rotating machinery. If a bearing fails, then the complete functionality of the machinery usually also fails. In some applications it might be very difficult or just extremely expensive to replace a failed bearing outside regular scheduled maintenance. Such applications might be deep sea applications, cruise ships or other continuous manufacturing lines. In an attempt to predict when a bearing needs to be replace before it fails and suitable also in an orderly scheduled manner, condition monitoring is done. If the machinery and bearings are physically in a location which is easily accessible, then the condition of a bearing can be assessed by for example vibration measurement. Equipment which is not accessible, such as deep sea applications need other means to assess the condition of a bearing to be able to assess when maintenance is needed. There are many ways of remotely assess the condition of a bearing, however, there seems to still be room for improvement.

SUMMARY

An object of the invention is to define a method and means to monitor the condition and load of a bearing. Load that a bearing is subjected to can influence the bearing life.

Another object of the invention is to define a unit for monitoring the condition and measure the load of a bearing without any electrical power at the bearing.

A further object of the invention is to define a Bragg grated optical fiber suitable for monitoring the condition and measuring the load of a bearing by measuring strain on the optical fiber.

The aforementioned objects are achieved according to the invention by the use of a Bragg grated optical fiber to sense the condition of a bearing and the load of the bearing, the bearing comprising a groove to increase the sensitivity of the fiber to both load variations and vibrations of the bearing.

The aforementioned objects are further achieved according to the invention by a bearing comprising a Bragg grated optical fiber having a plurality of grated areas, where physically adjacent grated areas are separated in the frequency plane. Suitably adjacent frequency bands correspond to grated areas on opposite sides of a bearing.

The aforementioned objects are also achieved according to the invention by a Bragg grated optical fiber for attachment on a circular circumference of a bearing, where the gratings are made to be parallel when the optical fiber is attached to the bearing.

The aforementioned objects are further achieved according to the invention by a bearing comprising a Bragg grated optical fiber having a plurality of grated areas, each grated area corresponds to a different area in the frequency characterized in that each grated area is grated in such a way that physically sequentially adjacent grated areas corresponds to frequency areas that are separated in the frequency plane.

Suitably each grated area is grated such that grated areas that are physically close together correspond to areas in the frequency plane that are far apart. Grated areas physically located in or around the loaded zone of the bearing suitably correspond to frequency areas in the frequency plane adjacent to frequency areas that correspond to grated areas physically located in or around the un-loaded zone of the bearing. Sometimes Bragg grated areas corresponding to different sensor types are mixed to corresponding frequency areas in the frequency plane in such a way that high bandwidth sensors are next to low bandwidth sensors in the frequency plane. A physical sequence of Bragg grated areas is different to the sequence of corresponding frequency areas in the frequency plane.

The aforementioned objects are also achieved according to the invention by a bearing comprising a Bragg grated optical fibre to measure one or more parameters of the bearing such as load, temperature, acceleration/vibration and identification. To be able to fit as many Bragg gratings as possible, the utilization of the corresponding frequency plane output is optimized by having low bandwidth next to large bandwidth sensors in the frequency place. The corresponding physical sensors such as load sensors on a bearing will not be adjacent. Sensors in the loaded zone are giving a high bandwidth output and sensors in the un-loaded zone are giving a low bandwidth output, thus even though these are not physically adjacent, the corresponding frequency areas are adjacent by appropriate grating.

By providing a method and a unit for sensing strain by optical means, condition monitoring and load measurements can be calculated kilometers away from the bearing by the transmission of strain data by optical means. Thus there is no need to provide any electrical power at the bearing. Applications such as monitoring bearings of deep sea pumps, kilometers under the sea surface, is made possible in a reliable manner without any electrical power locally at the bearing.

Other advantages of the invention will become apparent from the detailed description below.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the inventions, some examples of its use will now be described in connection with FIGS. 1 to 8B.

Figure 1:
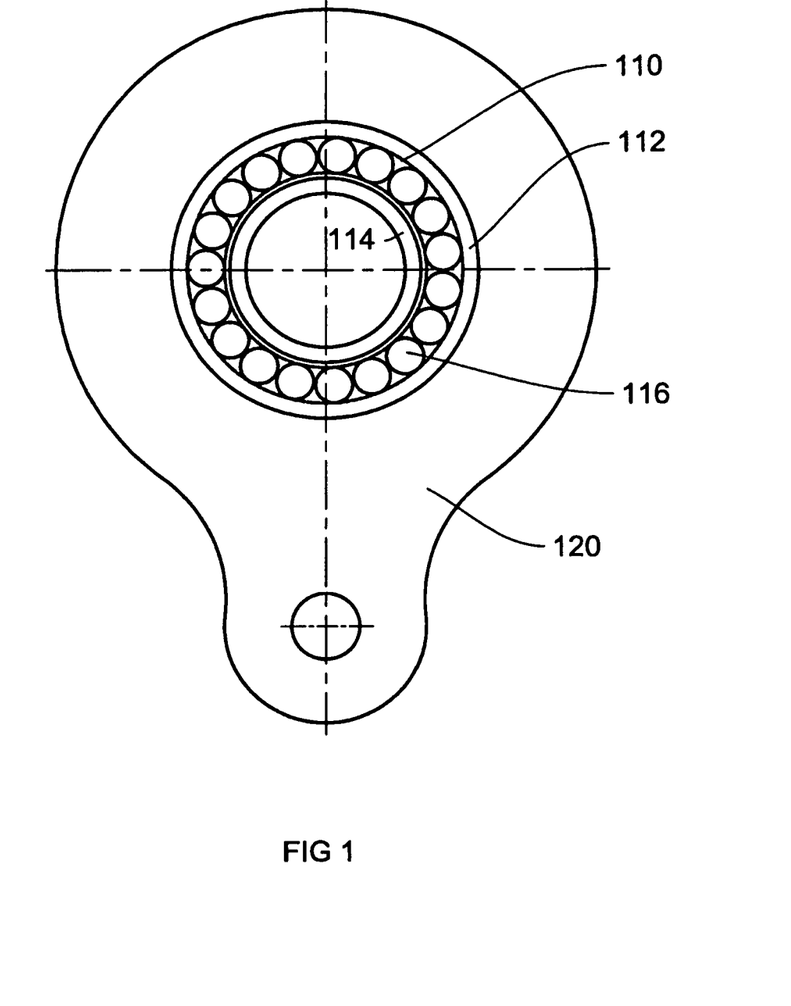
FIG. 1 shows a side view of a bearing in a housing, a typical implementation of the invention.

FIG. 1 illustrates a side view of a bearing 110 mounted in a housing 120. The bearing 110 comprises an outer 112, non-rotating, ring, an inner 114, rotating, ring with rolling elements 116 there between. This is a typical implementation of the inventions. An optical strain gauge, typically a Bragg grated optical fiber strain sensing unit, is according to the invention placed in a groove in the outer 112 non-rotating ring. The groove has to be large enough to accommodate the optical fiber, otherwise the bearing will not fit in the housing 120. The groove also have to be large enough and placed such that the sensitivity of the strain sensors is increased. This is due to weakening of the outer ring 112, such that for the same forces on the bearing, the bearing is deformed more thus putting a greater strain on the strain sensors. The groove must at the same time be small enough so that the integrity of the bearing is not jeopardized, that is if the groove is made too large, then the bearing will not be able to sustain its stated capacity. There is thus a compromise between these two conditions, which is also helped by clever placement of the groove.

Figure 2:
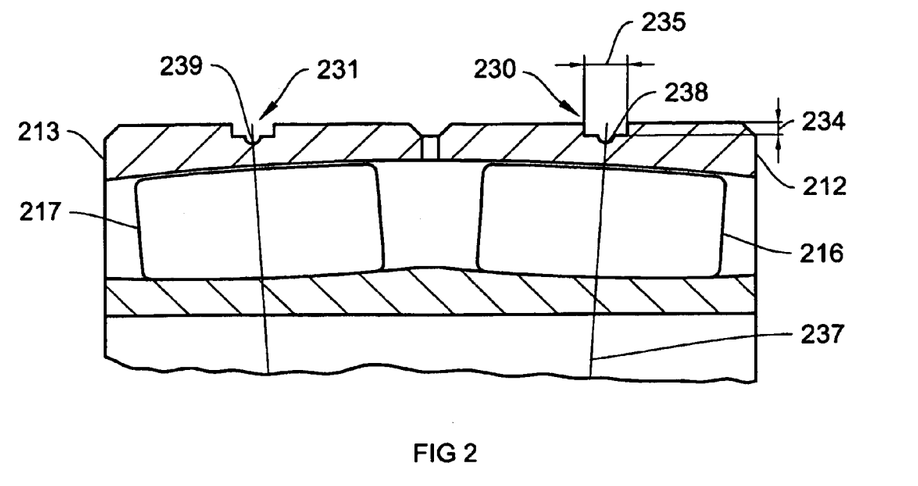
FIG. 2 shows a cross section of a part of a bearing according to one embodiment according to the invention.

FIG. 2 illustrates a cross section of a part of a bearing according to one embodiment of the invention. The bearing is a two row SRB comprising two outer rings 212, 213, each having a corresponding set of rolling elements 216, 217. In this embodiment, each row comprises a corresponding groove 230, 231. Each groove will have a width 235 and a height/depth 234. Suitable each groove will have a slit 238, 239 for placement of the optical fiber. The placement of the groove 230, 231 and specifically the corresponding slit 238, 239, is preferably along a load line 237 of each corresponding row. An optical fiber can go completely around a bearing, with strain sensing places, by means of grated section, suitably placed. That is one optical fiber comprising all the required grated sections. Alternatively, several optical fibers can be placed with their corresponding grated sections placed at different places.

Figure 3:
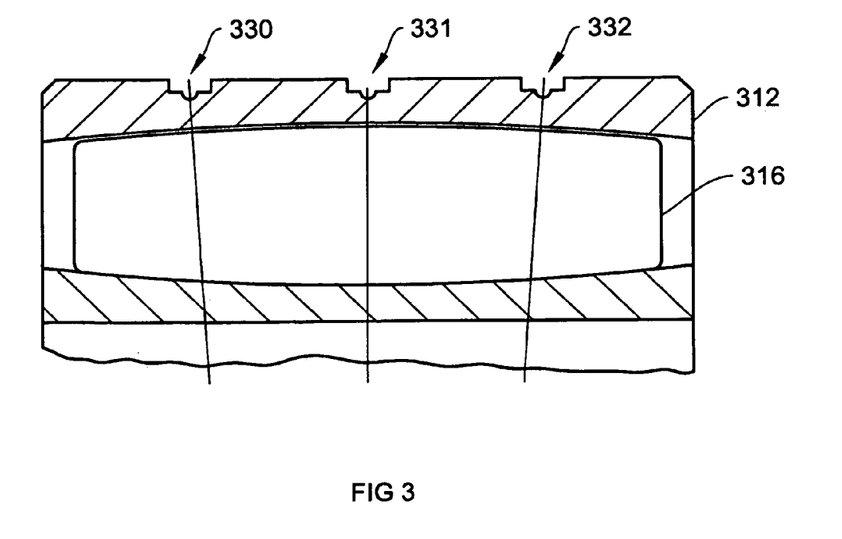
FIG. 3 shows a cross section of a part of a bearing according to another embodiment according to the invention.

FIG. 3 shows a cross section of a part of a bearing, a CARB, according to another embodiment according to the invention. This embodiment only comprises one outer ring 312 with one row of rolling elements 316, but multiple grooves 330, 331, 332.

Figure 4:
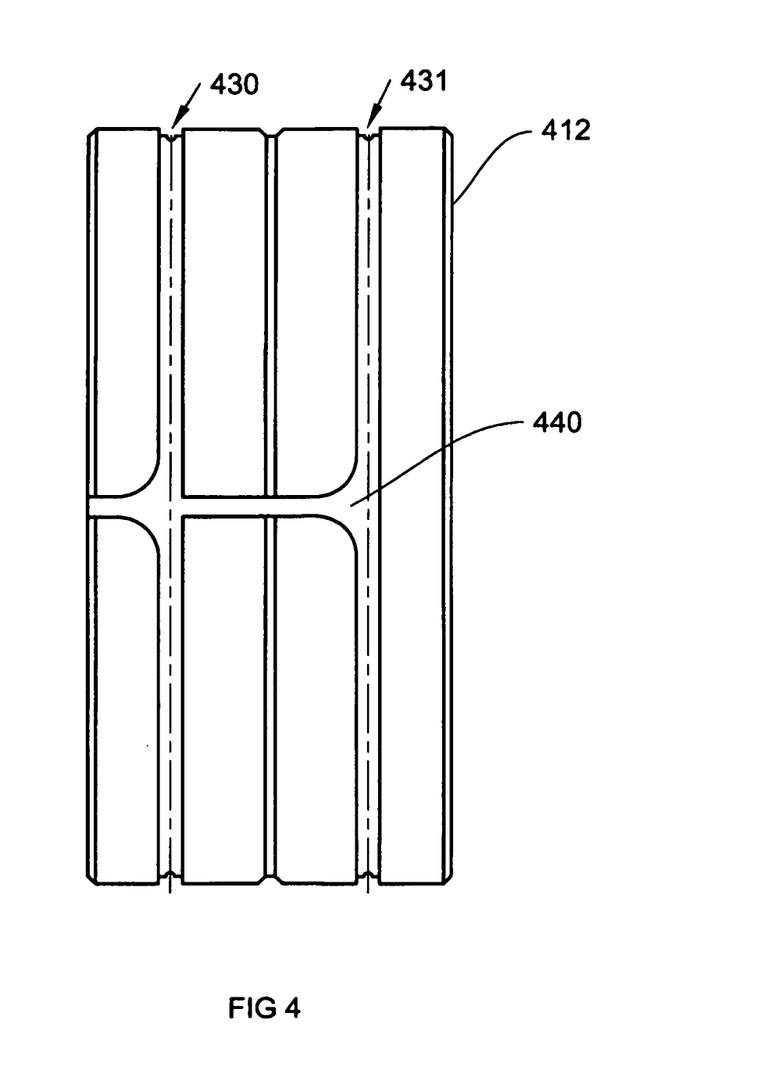
FIG. 4 shows a top view of a bearing according to the invention illustrating optical fiber access to measurement groove.

FIG. 4 illustrates a top view of a bearing according to the invention illustrating optical fiber access means 440 to measurement grooves 430, 431 in its outer ring 412.

Figure 5A:
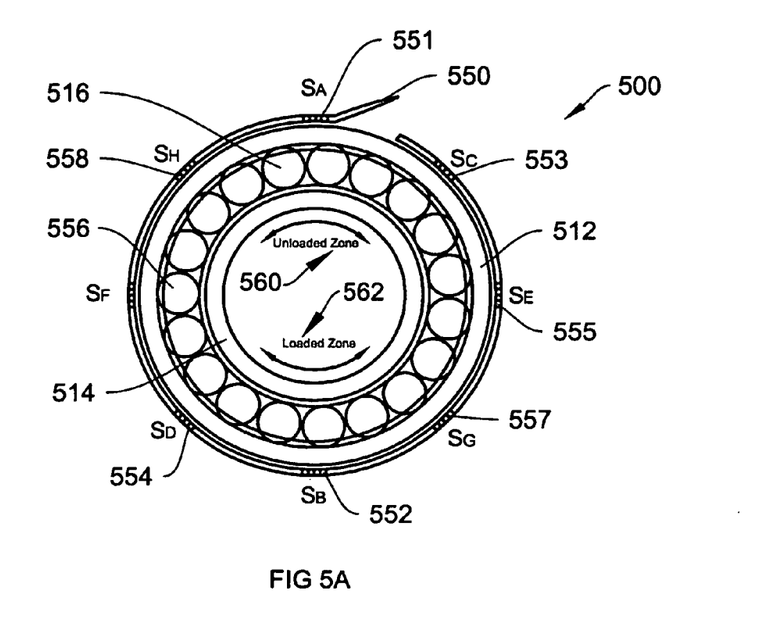
FIG. 5A shows a side sectional view of a bearing according to the invention illustrating an example of sensor distribution according to the invention around the bearing.

FIG. 5A illustrates a side sectional view of a bearing 500 with a non-rotating outer ring 512, rotating inner ring 514 with rolling elements 516 there between, according to the invention illustrating an example of sensor distribution 551, 552, 553, 554, 555, 556, 557, 558 according to the invention around the bearing. A Bragg grated optical fiber 550, will comprise one or more strain sensors 551, 552, 553, 554, 555, 556, 557, 558, each sensor defined by a grated section. Each grated section, as seen in detail below in relation to FIG. 5B will be represented in the frequency plane by a frequency 571, 572, 573, 574, 575, 576, 577, 578, that will vary in dependence on the strain of the corresponding grated section.

Figure 5B:
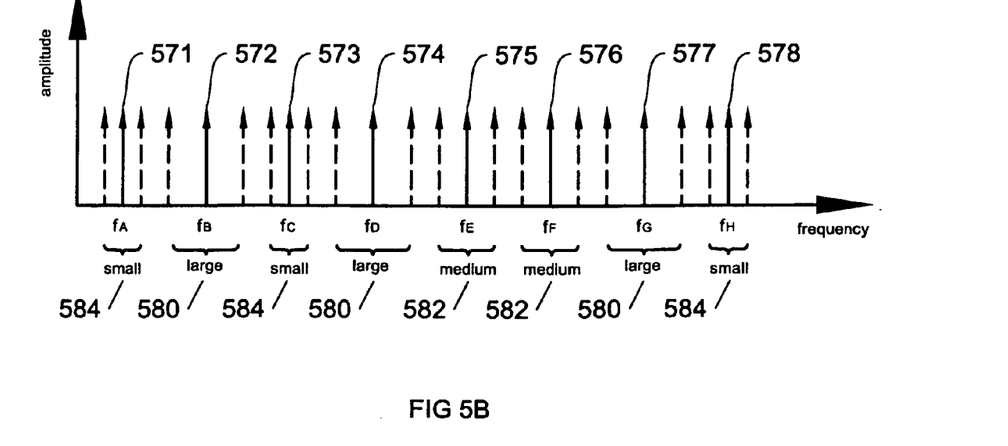
FIG. 5B shows the sensor frequency distribution according to the sensor placement of FIG. 5A.

If a sensor is in the loaded zone 562, then large variations 580 will result, sensors in the un-loaded zone will show small frequency variations, due to there being only small 584, if any load and load variations. There are of course sensors in between, with medium variations 582. According to the invention to use the fiber in an optimal way, to get in as many sensors as possible, without the frequency variations hitting each other, sensors are physically separated such that in the frequency spectrum adjacent sensor frequencies do not vary to a large 580 degree. Since a bearing will always have a loaded zone and an un-loaded zone on its opposite side, then sensor adjacent in frequency, will be placed physically on opposite sides of the bearing.

Figure 6A:
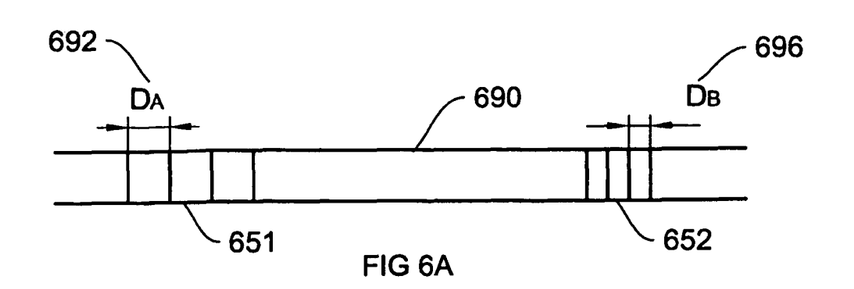
FIG. 6A shows a conventional optical fiber with Bragg grating.
Figure 6B:
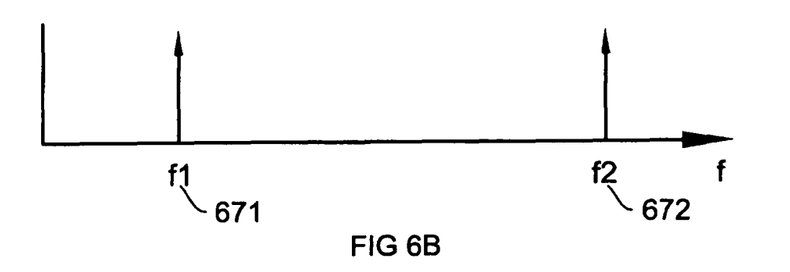
FIG. 6B shows the frequency response of the optical fiber of FIG. 6A.

FIG. 6A shows a conventional optical fiber 690 with Bragg grating, arranged flat. It comprises a first strain sensor 651 with a first strain sensor grating separation DA 692, and a second strain sensor 652 with a second strain sensor grating separation DB 696. The gratings will be evenly spaced through a cross section of the optical fiber and thus create, as can be seen in FIG. 6B nice peak frequency responses 671, 672 from each sensor.

Figure 7A:
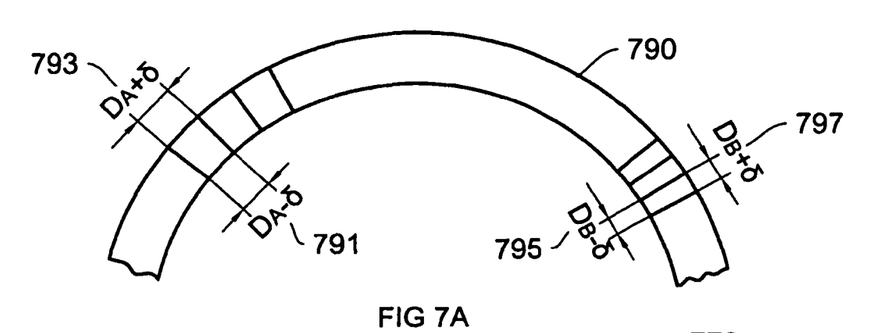
FIG. 7A shows a conventional optical fiber with Bragg grating that is bent, such as around a circular bearing.
Figure 7B:
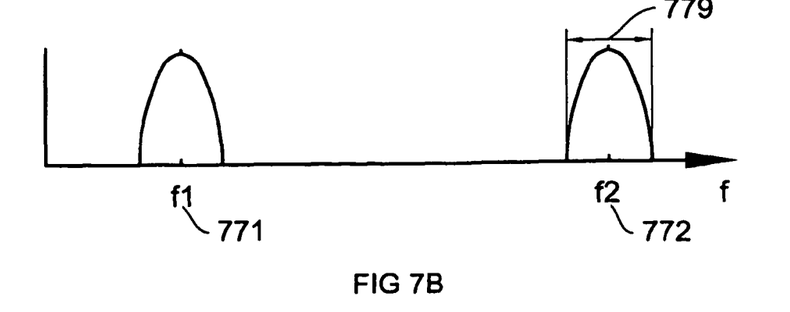
FIG. 7B shows the frequency response of the bent optical fiber of FIG. 7A.

FIG. 7A illustrates a conventional optical fiber 790 with Bragg grating that is bent, such as around a circular bearing. It also comprises a first strain sensor 751 and a second strain sensor 752. But as can be seen, when the fiber is bent, the inner side is compressed and the first strain sensor inside grating separation DA−δ 791 and the second strain sensor grating separation DB−δ 795 are both less than before. This in combination with the out side being stretched creating larger separation DA+δ 793, DB+δ 797, will create a varying separation across the fiber. This will create, as can be seen in FIG. 7B, wide frequency responses 779 instead of peaks at the center frequencies 771, 772.

Figure 8A:
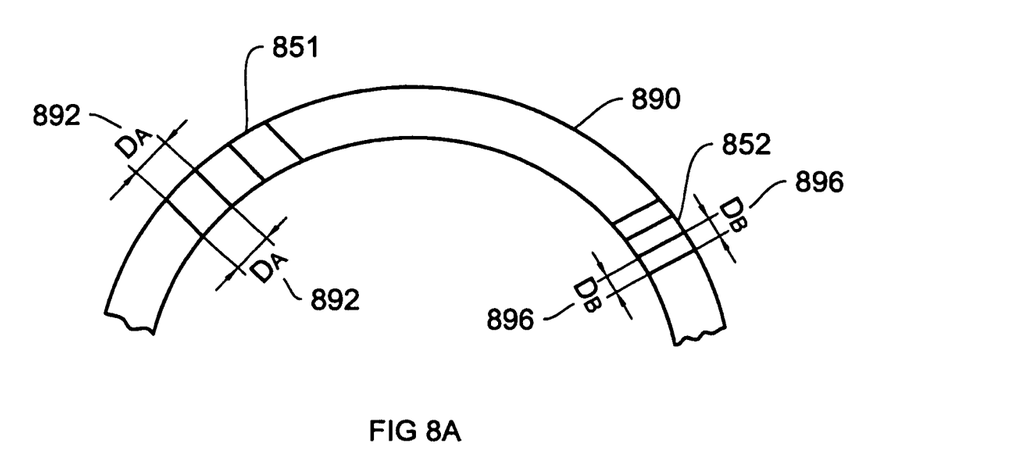
FIG. 8A shows a bent optical fiber with Bragg grating according to the invention.
Figure 8B:
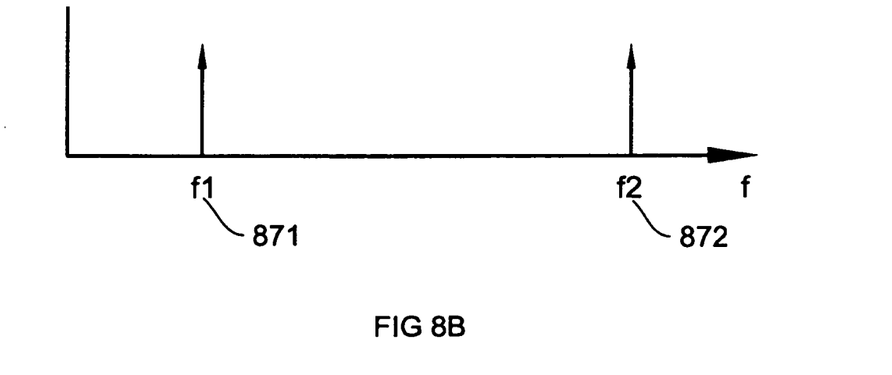
FIG. 8B shows the frequency response of the optical fiber according to the invention of FIG. 8A.

FIG. 8A shows a bent optical fiber 890 with Bragg grating arranged in a first 851 and second 852 strain sensor, according to the invention. An optical fiber with Bragg grating according to the invention, will have an equal grating separation DA 892, DB 896 through the fiber, when the fiber is bent, such as around a circular bearing. As can be seen in FIG. 8B, we achieve the desired peak frequency responses 871, 872, when the fiber is bent. The grating could be added after mounting of the fiber on the bearing.

The invention is not restricted to the above-described embodiments, but may be varied within the scope of the following claims.

FIG. 1 shows a side view of a bearing in a housing, a typical implementation of the invention,
- 110 Bearing,
- 112 Outer, non-rotating, ring of the bearing,
- 114 Inner, rotating, ring of the bearing,
- 116 Rolling elements of the bearing, located between the outer and inner ring,
- 120 Housing.

FIG. 2 shows a cross section of a part of a bearing according to one embodiment according to the invention,
- 212 First outer ring belonging to the first row,
- 213 Second outer ring belonging to the second row,
- 216 Rolling elements of first row,
- 217 Rolling elements of second row,
- 230 First groove for first row,
- 231 Second groove for second row,
- 234 Height/Depth of groove,
- 235 Width of groove,
- 237 Load line of first row,
- 238 First optical fiber slit located in first groove,
- 239 Second optical fiber slit located in second groove, FIG. 3 shows a cross section of a part of a bearing according to another embodiment according to the invention,
- 312 Outer ring,
- 316 Rolling elements,
- 330 First groove,
- 331 Second groove,
- 332 Third groove, FIG. 4 shows a top view of a bearing according to the invention illustrating optical fiber access to measurement groove.
- 412 Outer ring,
- 430 First groove,
- 431 Second groove,
- 440 Optical fiber passage for entry/exit.

FIG. 5A shows a side sectional view of a bearing according to the invention illustrating an example of sensor distribution according to the invention around the bearing,
- 500 Bearing according to the invention with a optical fiber strain sensor unit,
- 512 Outer, non-rotating, ring of the bearing,
- 514 Inner, rotating, ring of the bearing,
- 516 Rolling elements of the bearing, located between the outer and inner ring,
- 550 Optical fiber strain sensor unit,
- 551 SA—strain sensor,
- 552 SB—strain sensor,
- 553 SC—strain sensor,
- 554 SD—strain sensor,
- 555 SE—strain sensor,
- 556 SF—strain sensor,
- 557 SG—strain sensor,
- 558 SH—strain sensor,
- 560 Unloaded zone of bearing,
- 562 Loaded zone of bearing.

FIG. 5B shows the sensor frequency distribution according to the sensor placement of FIG. 5A,
- 571 fA center frequency of SA—strain sensor,
- 572 fB center frequency of SB—strain sensor,
- 573 fC center frequency of SC—strain sensor,
- 574 fD center frequency of SD—strain sensor,
- 575 fE center frequency of SE—strain sensor,
- 576 fF center frequency of SF—strain sensor,
- 577 fG center frequency of SG—strain sensor,
- 578 fH center frequency of SH—strain sensor,
- 580 Large frequency variation due to large load variations
- 582 Medium frequency variation due to medium load variations
- 584 Small frequency variation due to large small variations FIG. 6A shows a conventional optical fiber with Bragg grating, arranged flat,
- 651 First strain sensor,
- 652 Second first strain sensor,
- 690 Optical fiber sensor unit with Bragg grating
- 692 First strain sensor grating separation DA,
- 696 Second strain sensor grating separation DB, FIG. 6B shows the frequency response of the optical fiber of FIG. 6A,
- 671 Frequency response of first strain sensor,
- 672 Frequency response of second strain sensor, FIG. 7A shows a conventional optical fiber with Bragg grating that is bent, such as around a circular bearing,
- 751 First strain sensor,
- 752 Second first strain sensor,
- 790 Optical fiber sensor unit with Bragg grating
- 791 First strain sensor inside grating separation DA−δ,
- 793 First strain sensor outside grating separation DA+δ,
- 795 Second strain sensor grating separation DB−δ,
- 797 Second strain sensor grating separation DB+δ, FIG. 7B shows the frequency response of the bent optical fiber of FIG. 7A,
- 771 Center frequency response of first strain sensor,
- 772 Center frequency response of second strain sensor,
- 779 Frequency width.

FIG. 8A shows a bent optical fiber with Bragg grating according to the invention,
- 851 First strain sensor,
- 852 Second first strain sensor,
- 890 Optical fiber sensor unit with Bragg grating
- 892 First strain sensor outside and inside grating separation DA,
- 896 Second strain sensor outside and inside grating separation DB, FIG. 8B shows the frequency response of the optical fiber according to the invention of FIG. 8A,
- 871 Frequency response of first strain sensor,
- 872 Frequency response of second strain sensor,

The invention claimed is:

1. A bearing comprising a Bragg grated optical fiber having a plurality of grated areas, each grated area corresponding to a different area in a frequency plane, wherein each grated area is grated such that physically sequentially adjacent grated areas correspond to frequency areas that are separated in the frequency plane, and wherein a physical sequence of Bragg grated areas is different to a sequence of corresponding frequency areas in the frequency plane.

2. The bearing according to claim 1, wherein each grated area is grated such that grated areas that are physically close together correspond to areas in the frequency plane that are far apart.

3. The bearing according to claim 1 or 2, wherein grated areas physically located in or around a loaded zone of the bearing correspond to frequency areas in the frequency plane adjacent to frequency areas that correspond to grated areas physically located in or around an un-loaded zone of the bearing.

4. The bearing according to claim 1, wherein Bragg grated areas corresponding to different sensor types are mixed to corresponding frequency areas in the frequency plane such that high bandwidth sensors are next to low bandwidth sensors in the frequency plane.

5. The bearing according to claim 1, wherein the Bragg grated optical fiber comprises one or more strain sensors, each of the one or more strain sensors being defined by a grated section, wherein strain sensors adjacent in frequency are placed physically on opposite sides of the bearing.

6. The bearing according to claim 1, wherein the frequency areas in the frequency plane are non-overlapping.

* * * * *